(12) United States Patent
Williams et al.

(10) Patent No.: US 6,564,878 B2
(45) Date of Patent: May 20, 2003

(54) VERTICAL ROTATING TILLER

(76) Inventors: Ernest H. Williams, 174 Summit Retreat Dr., Summerville, SC (US) 29485; Charles A. Williams, 106 Red Fox Run, Summerville, SC (US) 29485

( * ) Notice: Subject to any disclaimer, the term of this patent is extended or adjusted under 35 U.S.C. 154(b) by 0 days.

(21) Appl. No.: 09/871,105

(22) Filed: May 31, 2001

(65) Prior Publication Data

US 2002/0182010 A1 Dec. 5, 2002

(51) Int. Cl.[7] .............................................. A01B 45/02
(52) U.S. Cl. ...................................................... 172/49.5
(58) Field of Search ................................ 111/113, 200, 111/178, 127, 100, 118; 172/49.5, 51, 59, 110, 111, 72, 63, 69

(56) References Cited

U.S. PATENT DOCUMENTS

| | | | |
|---|---|---|---|
| 2,394,771 A | * | 2/1946 | Hill ................................ 111/89 |
| 3,638,539 A | * | 2/1972 | Lewis .......................... 172/4.5 |
| 4,126,185 A | * | 11/1978 | van der Lely .............. 172/125 |
| 4,133,390 A | | 1/1979 | Reaume |
| 5,061,119 A | | 10/1991 | Balthaus et al. |
| 5,202,033 A | | 4/1993 | Standforth et al. |
| 5,458,747 A | | 10/1995 | Marks et al. |
| 5,524,500 A | | 6/1996 | Carter |
| 5,622,123 A | * | 4/1997 | Rajamannan ............... 111/118 |
| 5,782,309 A | | 7/1998 | Bultman |
| 5,836,390 A | | 11/1998 | Apps et al. |
| 5,975,798 A | | 11/1999 | Liskowitz et al. |
| 5,988,292 A | | 11/1999 | Knotts |
| 6,068,061 A | | 5/2000 | Smith et al. |

* cited by examiner

*Primary Examiner*—Robert E. Pezzuto
(74) *Attorney, Agent, or Firm*—Kathleen M. Harleston; Harleston Law Firm LLC

(57) ABSTRACT

A rotatable tiller apparatus for use in mixing soils in situ, including: (a) a vertically oriented rotatable drive shaft, connected to and driven by a motor external to the apparatus; (b) a drive assembly connected to the drive shaft; (c) at least two vertically oriented, rotatable cutting shafts connected to the drive shaft through the drive assembly and at least one support plate; (d) a sprocket assembly within the drive assembly connected to the drive shaft, the sprocket assembly comprising at least one rotatable sprocket for each cutting shaft; (e) a device for rotating the sprockets in a direction counter to the rotation of the drive shaft, the device being driven by the motor, the sprockets being rotatable in the same direction and at the same speed as one another; and (f) at least two tine assemblies arranged vertically in tandem along each of the cutting shafts, each tine assembly including at least one tine with at least one blade at its end.

13 Claims, 6 Drawing Sheets

VERTICAL ROTATING TILLER

BACKGROUND OF THE INVENTION

1. Technical Field

The present invention is a method for treating contaminated soils and a vertical rotating tiller, more particularly a rotatable apparatus for breaking up contaminated soils, introducing treatment reagents, and mixing the reagents and the soils to ensure effective remediation.

2. Background Information

Contaminated soils often require addition of various chemical or biological treatment reagents in order to clean the soil. Treatment may include addition of liquid or powder neutralization chemicals (for example, to neutralize acids or bases); stabilization agents (for example, to solidify soils containing hazardous liquids, so that toxic constituents do not leach from the soil); and biological agents (for example, bacteria that consume certain contaminants and render them harmless). Generally, treatment may take place off-site, when contaminated soils are removed to a treatment facility, or treated in place, when the soils are allowed to remain and are treated where they are. Contaminated soils vary widely in composition, even within a single location, both vertically and horizontally, and contaminants are often not dispersed evenly throughout the soils. Further complicating treatment is the common presence in soil of naturally occurring metals, such as iron or lead, in certain locations. Soil make-up varies widely from place to place, and the types and levels of contamination vary as widely. Federal and state imposed standards vary according to the type of contaminant (e.g. heavy metals) and the location. In order for treatment reagents to have the desired effect, they must be thoroughly and evenly dispersed and mixed with the soils and with the contaminants. Therefore, it is necessary to use an effective means of introducing the reagents into the soil, breaking up and mixing the soils, and mixing the reagents with the soils. If the reagents are not well-mixed with the soil, contamination will remain and further treatment will be necessary to meet standards. To facilitate treatment in place, or in situ, an effective mixing apparatus should be mobile and reusable, and require a minimum of set-up on site. Cleaning up contaminated soils can be tremendously expensive, and part or all of the bill is often footed by the taxpayer. A quick and effective piece of treatment equipment can bring great savings in labor and cost.

BRIEF SUMMARY OF THE INVENTION

The present invention is an apparatus and method for breaking up and mixing heterogeneous soils, and blending treatment reagents or other materials with the soils. The apparatus comprises, generally:

(a) a vertically oriented rotatable drive shaft, connected to and driven by a motor external to the apparatus;
(b) a drive assembly connected to the drive shaft;
(c) at least two vertically oriented, rotatable cutting shafts connected to the drive shaft through the drive assembly and at least one support plate, at least one of the cutting shafts being generally parallel to the drive shaft;
(d) a sprocket assembly within the drive assembly connected to the drive shaft, the sprocket assembly comprising at least one rotatable sprocket for each cutting shaft;
(e) a means of rotating the sprockets in a direction counter to the rotation of the drive shaft, the means of counter-rotating the sprockets being driven by the motor, the sprockets being rotatable in the same direction and at the same speed as one another; and
(f) at least two generally horizontally oriented tine assemblies connected to each of the cutting shafts, the tine assemblies being arranged vertically in tandem along each of the cutting shafts, each tine assembly comprising at least one tine, the tines being rotatable with the corresponding cutting shaft, each tine being attached to each tine assembly, each tine having at least one blade at its end. The method herein comprises stabilizing and treating contaminated soils in place by vertically tilling and mixing the soils and simultaneously injecting treatment reagents.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
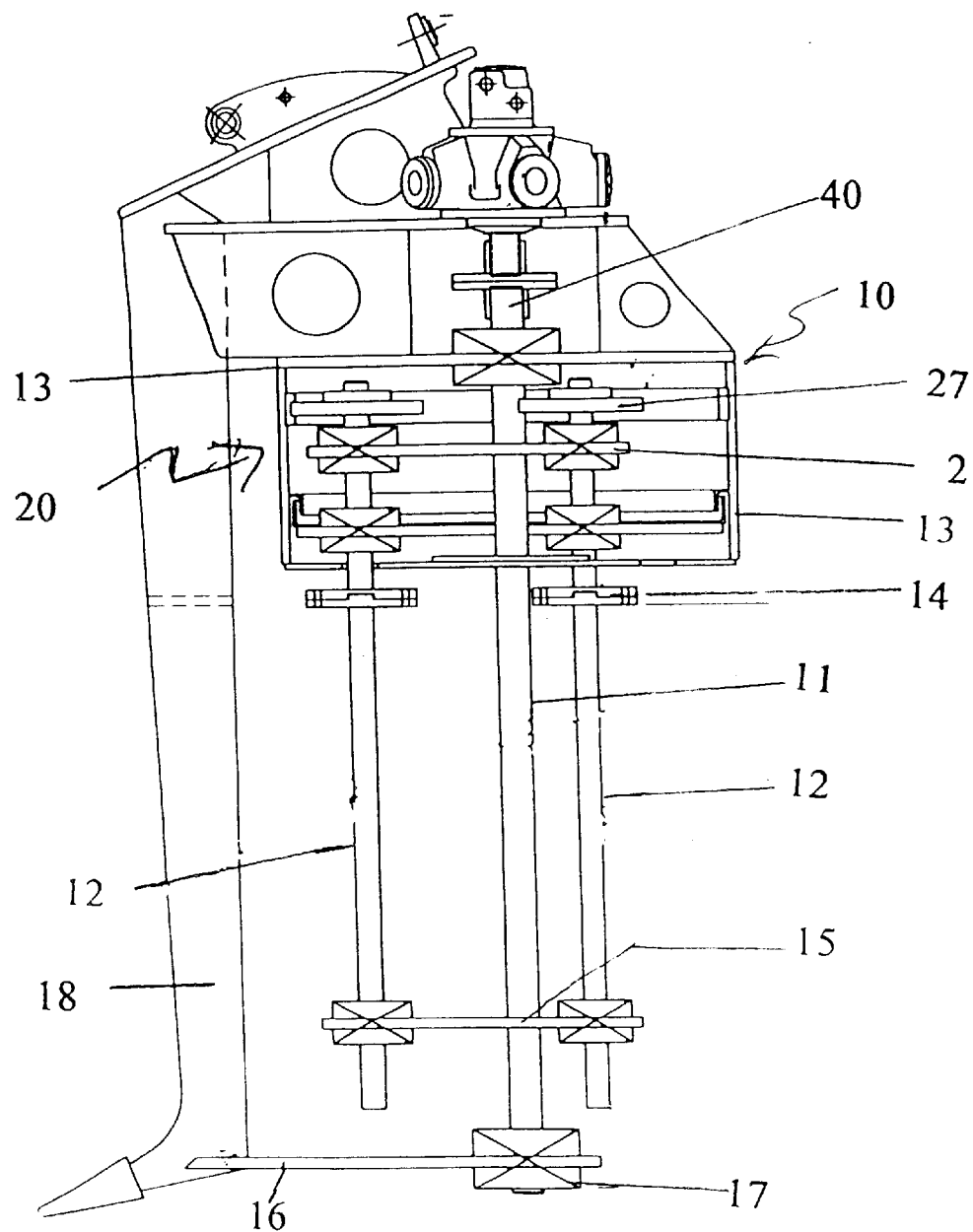
FIG. 1 is a side elevational view of a tiller apparatus according to the present invention, shown with a central drive shaft and two cutting shafts and without tine assemblies.

In the following description, like reference characters designate like or corresponding parts throughout the several views. Also, in the following description, it is to be understood that such terms as "front," "upper," "lower," "within," and the like are words of convenience and are not to be construed as limiting terms. Referring in more detail to the drawings, the invention will now be described.

Referring to FIG. 1, an apparatus according to the present invention, generally referred to as 10, for breaking up and mixing soils is shown in simplified form for purposes of illustration. The apparatus 10 includes a drive assembly 20, which is enclosed by a drum-shaped housing 13. The drive assembly 20 is attached to a vertically oriented drive shaft 11 and three cutting shafts 12 (two shown). The cutting shafts 12 are supported by and surround the drive shaft 11 via several support plates. The cutting shafts, which are also oriented in a vertical direction, run parallel to each other and the drive shaft 1 1. The apparatus 10 is particularly well-adapted for mixing treatment reagents into contaminated soil, particularly soil which has been contaminated with heavy metals, in situ during environmental remediation efforts.

Continuing with FIG. 1, a lower portion of each cutting shaft 12 is connected to an upper portion of the cutting shaft by a sheer coupling 14. Four small bolts in the sheer couplers 14 sheer if torque is too high. The sheer couplers are preferred herein because they prevent the apparatus from damaging itself. The lower portions of the cutting shafts 12 are prevented from bowing outward by a shaft guide 15. The guide 15 is attached to the drive shaft 11 and the cutting shafts 12, which pass through apertures in the guide 15. The base of the drive shaft 11 is affixed to a horizontally oriented lower support plate 16 by a lower bearing 17. The drive shaft 11 passes through an aperture in the lower support plate 16 and is affixed to the plate 16 by the lower bearing 17. A front portion of the lower support plate 16 is affixed to a vertically oriented ripper 18 at the front of the apparatus 10. The lower support plate 16 stabilizes the drive shaft 11 and the ripper 18. The apparatus 10 is adapted to be mounted on an excavator (not shown) or another suitable piece of equipment. In case flying rocks and other debris become a problem on some jobs, the present apparatus may include a detachable shield (not shown) suspended from the front of the apparatus, which drags along the ground as the apparatus moves.

Figure 2:
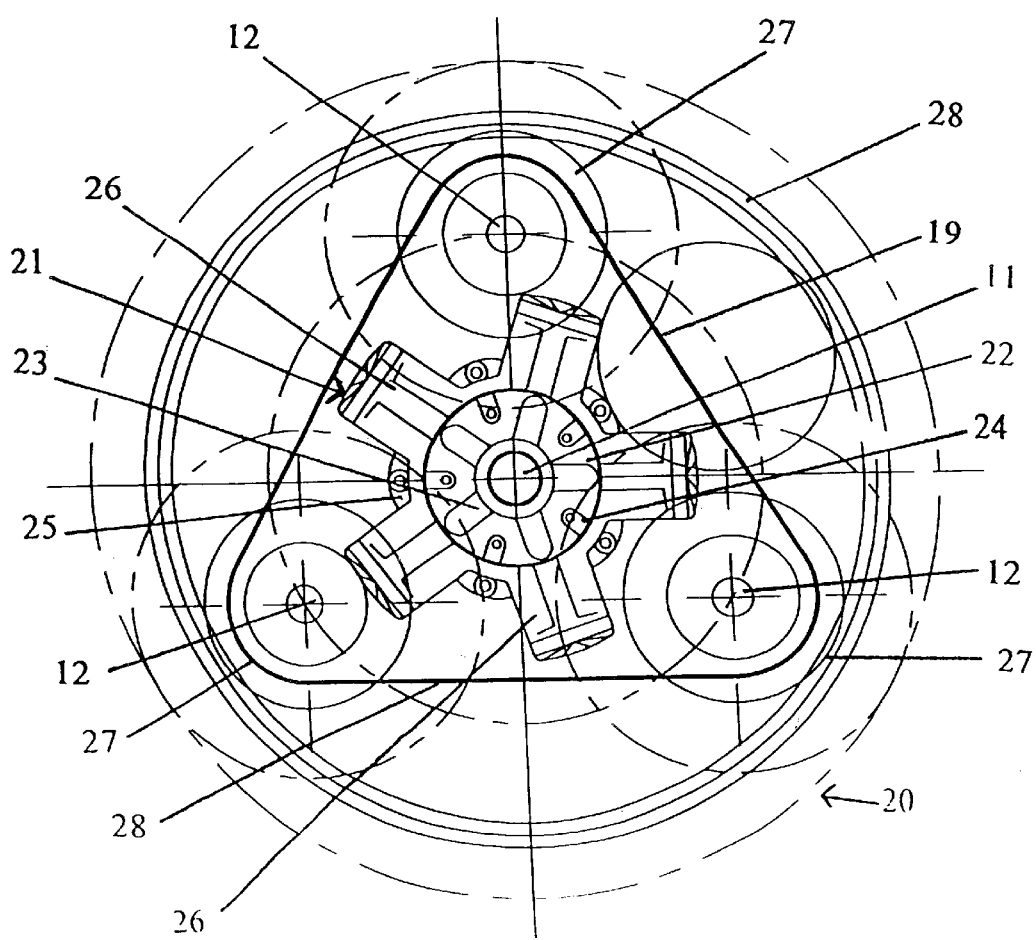
FIG. 2 is a latitudinal cross-sectional view of the apparatus taken along line 2—2 of FIG. 1, showing a central drive shaft and drive mechanism and three cutting shafts.
Figure 3:
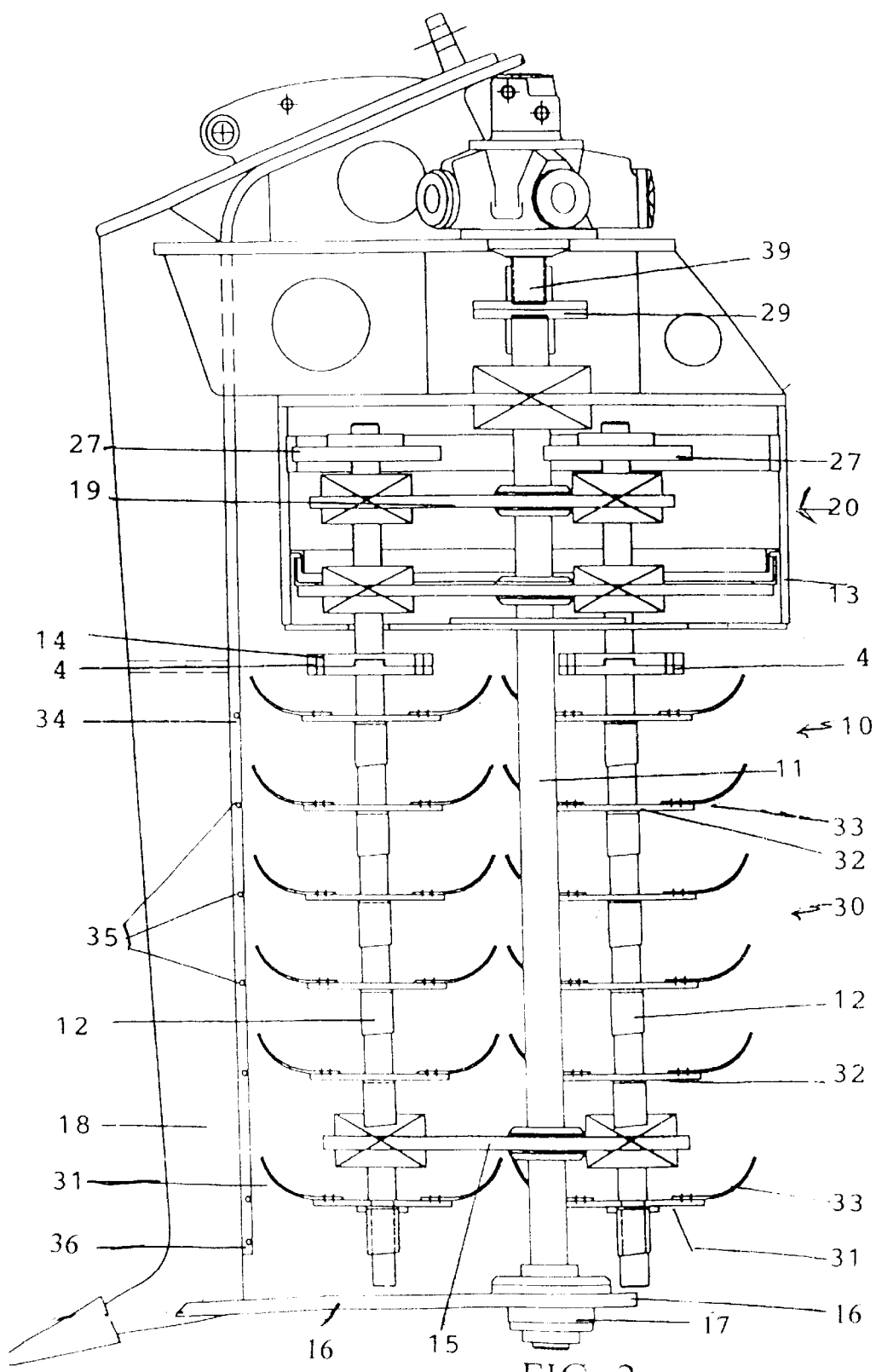
FIG. 3 is a side elevational view of an apparatus according to the present invention, showing a central drive shaft, cutting shafts, cutting assembly, and injection line.

FIGS. 1, 2 and 3 illustrate the drive assembly 20, which includes a central sprocket assembly 21 attached to the upper portion of the drive shaft 11. The central sprocket assembly 21 includes a core 22 surrounding the drive shaft 11, in which a plurality of cams 23 (five are shown in this preferred embodiment, although a greater number could be used) radiate from the drive shaft 11 placed between a corresponding number of nubs 24 radiating inward from the inner circumference of the core 22. Affixed to the outside of the core 22 are a sleeve 25 and a number of outer cams 26 (five are shown in the preferred embodiment, although a greater number could be used) radiating outward from the core 22. Two cutting shafts are seen from the side of the apparatus 10 in FIGS. 1 and 3, and three are shown in FIG. 2, which is a cross-section of FIG. 1 through the housing 19. FIG. 3 shows a preferred embodiment of the apparatus 10.

Continuing with FIGS. 1 through 3, the upper portions of the three cutting shafts 12 fit into and are attached to the drive assembly 20, where they are attached to the drive shaft 11 by means of at least one upper support plate 19. Sprockets 27, mounted in tandem one above the other with a space between, surmount the upper portion of each cutting shaft 12 (see FIG. 3). A chain 28 extends around the three sprockets 27, as shown in FIG. 2. The outer surface of each outer cam 26 just contacts the circumference of each sprocket 27. FIG. 3 shows the drive assembly 20, the upper support plate 19, and the ripper 18. The drive shaft 11 may be attached at its upper end 40 to a standard motor, which when operating turns the drive shaft 11.

Figure 5:
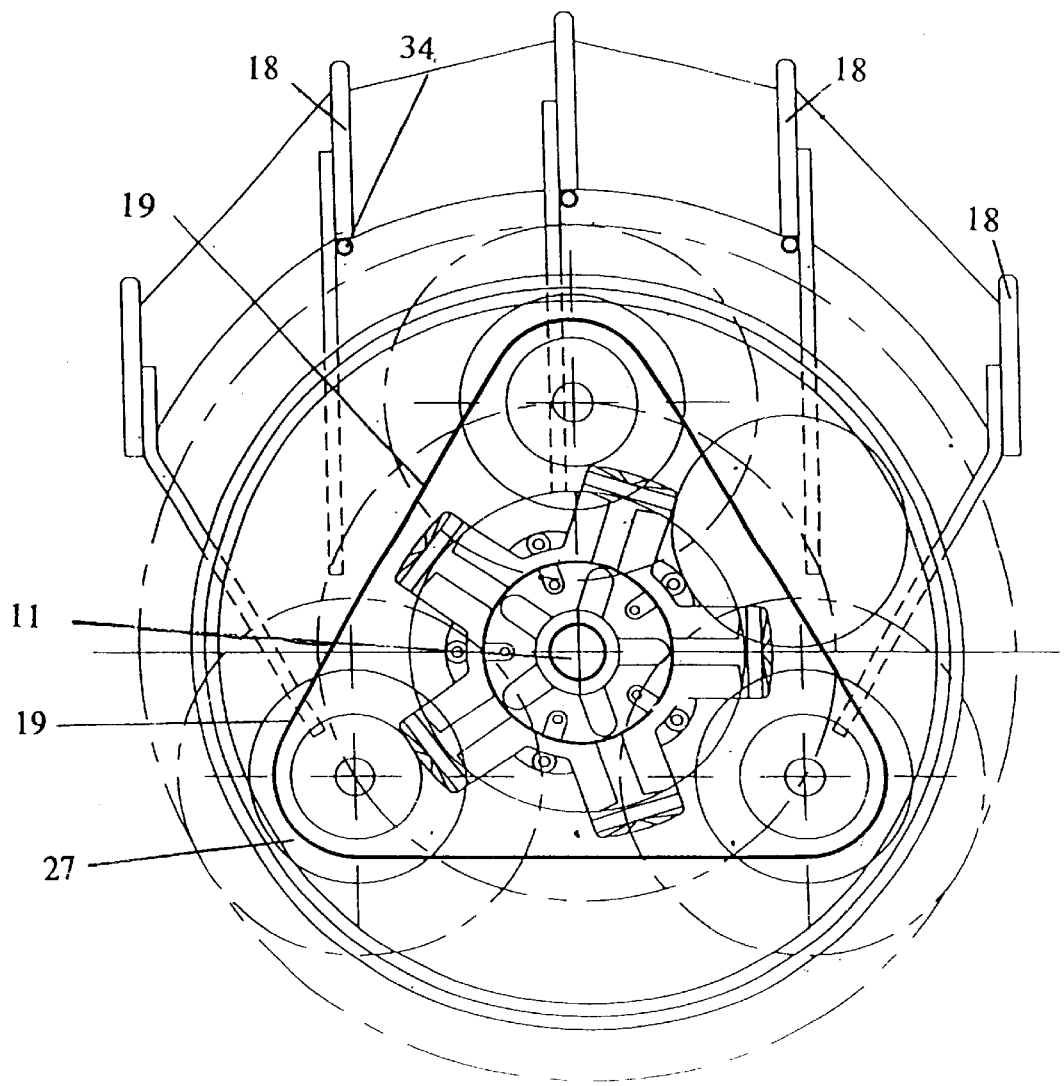
FIG. 5 is a latitudinal cross-sectional plan view of a preferred embodiment of an apparatus according to the present invention, showing the central drive shaft and drive mechanism and three cutting shafts.

FIG. 5 shows a cross-section of an alternate embodiment: an apparatus with a wider ripper 18 at the front, versus the three membered ripper shown in FIG. 3. Also, the embodiment of FIG. 5 has two off-centered injection lines 34. The widest circles around the three sprockets 27 of FIG. 5 show the area of the tines 32 when they are spinning.

Figure 4:
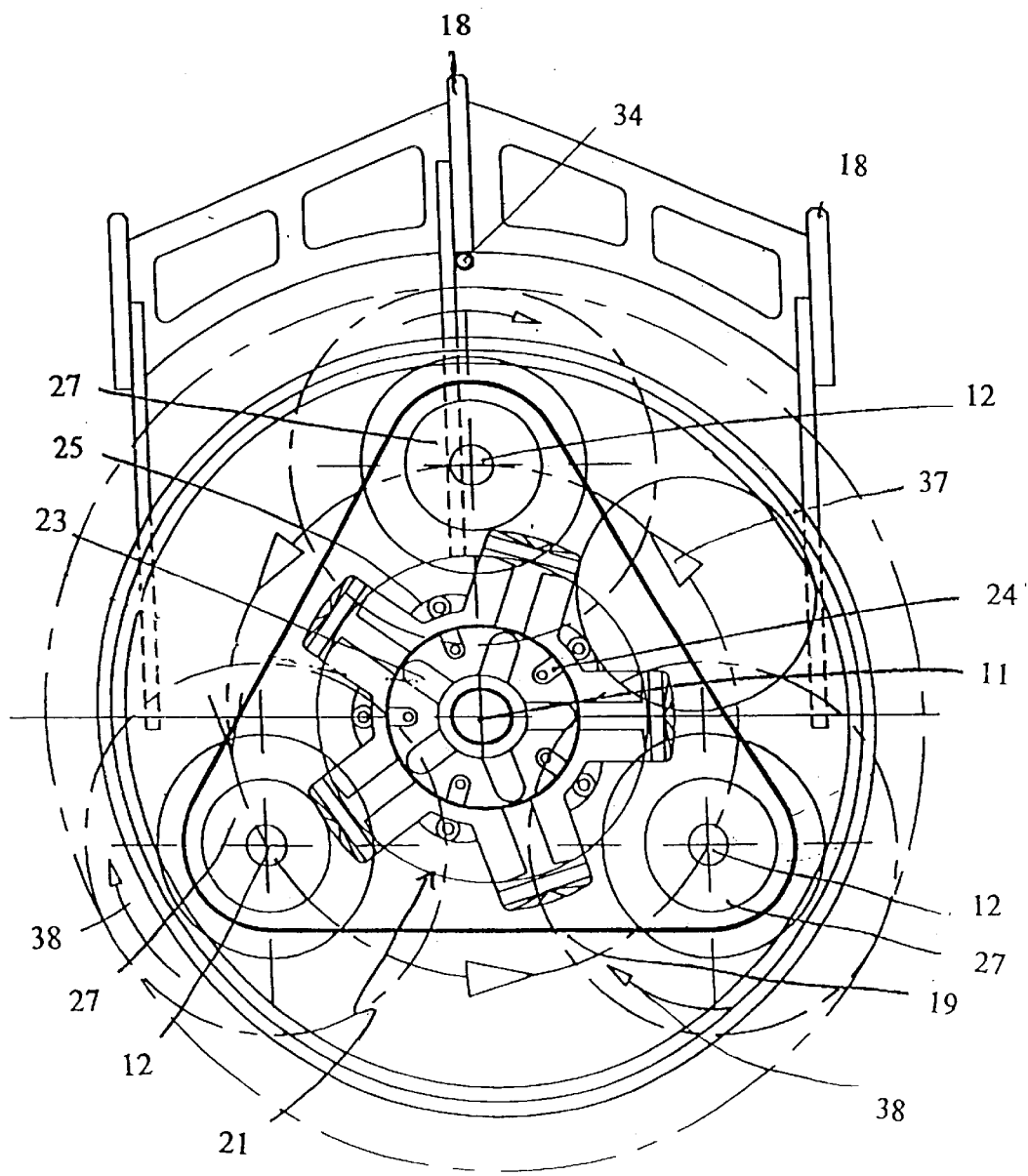
FIG. 4 is a latitudinal cross-sectional view of the apparatus taken along line 4—4 of FIG. 3, showing the directions of rotation of the drive shaft and the cutting shafts.

FIG. 4 depicts a cross-section of the apparatus at its mid-section. A generally central drive shaft 11 and drive mechanism and three cutting shafts 12 are surrounded by a housing. When the motor is operating, the turning drive shaft 11 will cause the attached core 22 and inner cams 23 to rotate (see FIG. 4). Although FIG. 4 shows rotation in a counter-clockwise direction by directional arrows 37, this direction of rotation is not essential to the present invention, and a clockwise rotation would be equally suitable. However, the sprockets 27 rotate in an opposite direction to the rotation of the drive shaft 11. When the motor is operating, the inner cams 23 make contact with the nubs 24, causing the entire sprocket assembly 21 and sleeve 25 to rotate in the same direction (shown as counterclockwise in FIG. 4). The rotation of the drive shaft 11 also will cause the cutting shafts 12 to revolve around the drive shaft 11 in the same direction. The outer cams 26 repeatedly contact the sprockets 27 on the cutting shafts 12, causing each sprocket 27 to rotate in the opposite (shown as clockwise) direction, which rotation also pulls a chain 28 in the same direction, thus causing a constant rotation of each sprocket 27. This clockwise rotation is shown in FIG. 4 by directional arrow 38. The rotation of each sprocket 27 causes the attached cutting shaft 12 to rotate independently of the drive shaft 11, in addition to revolving around the drive shaft 11. The support plate connects to the drive shaft 11 and the cutting shafts 12.

Importantly, only one drive is needed to turn both the drive shaft 11 and the cutting shafts 12 in opposite directions. The same motor is used to drive both the drive shaft 11 and the direct or indirect means of counter-rotating the cutting shaft assemblies. A preferred means of directly counter-rotating the cutting shaft assemblies is the chain 28, but a rubber tire could be used in place of the chain 28 just inside the gear housing for providing the same action the chain provides. When the support plate rotates, the sprockets 27 turn in an opposite direction to the rotation of the drive shaft 11 against the chain (gear) 28. The opposite resisting force of the central drive shaft 11 turning counterclockwise causes the interior sprockets 27 to turn clockwise. The chain 28 causes the sprockets 27 to spin. The size of the sprockets 27 is thus a factor in determining the rate at which it turns.

The drive shaft 11 is preferably directly connected to a central drive shaft coupling 29, as shown in FIG. 3, but a drive shaft herein could also be off to one side of the apparatus 10 or the other. Above the drive shaft coupling 29 is an output shaft 39 connected to a hydraulic motor.

Figure 6:
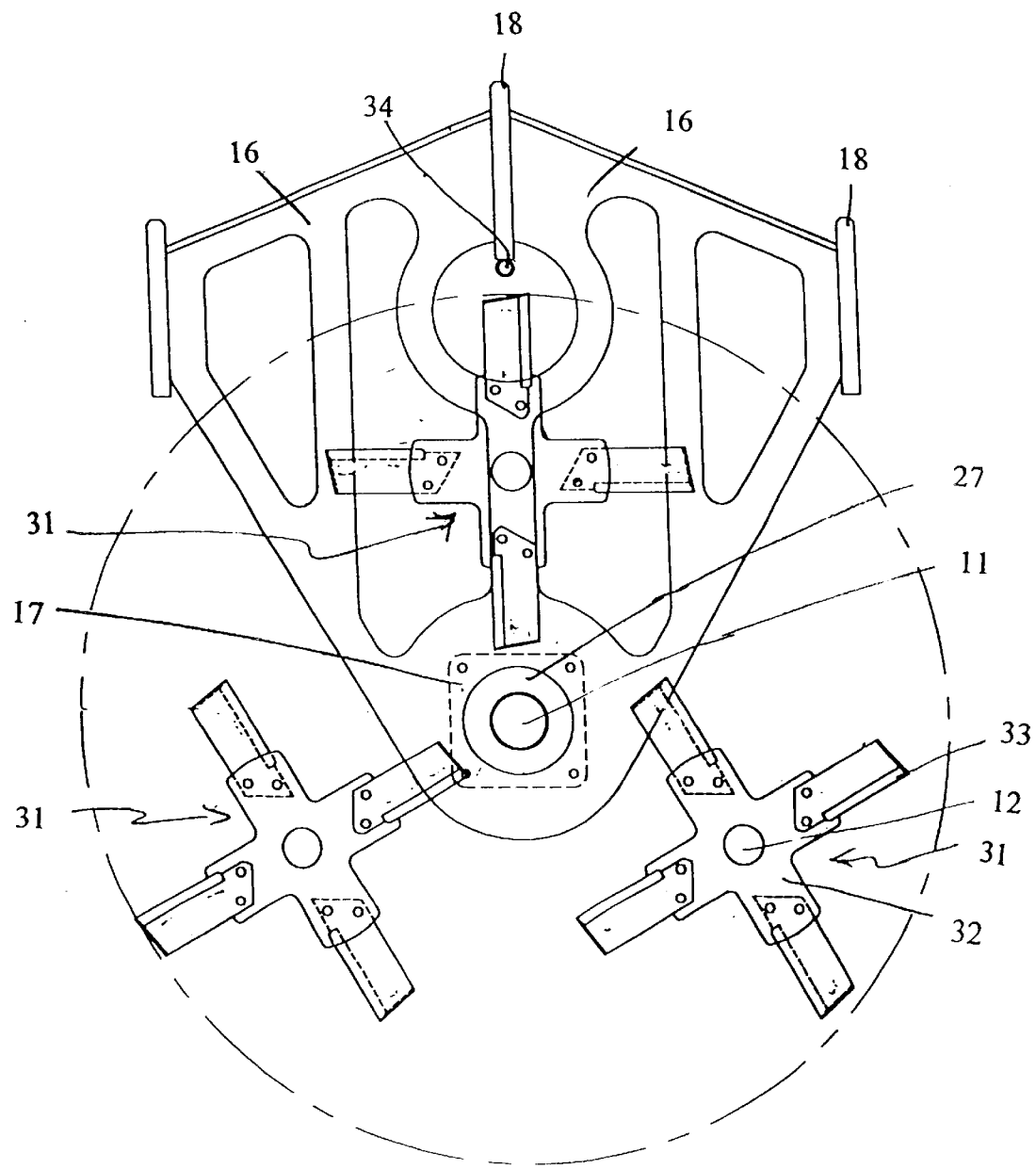
FIG. 6 is a bottom plan view of the apparatus according to FIG. 3 taken across line 6—6, showing the cutting assembly.

Turning to FIGS. 3 and 6, the cutting shaft assembly 30 includes three cutting shafts 12 (FIG. 3 shows only two of the three), each with a series of tine assemblies 31 arranged in tandem vertically along the shaft length. FIG. 3 depicts six such tine assemblies 31 on each cutting shaft 12 in the preferred embodiment, although a greater or lesser number of sets could be used. FIG. 6 depicts a cross-section taken at a lower portion of the apparatus 10. In the preferred embodiment of FIG. 6, each tine assembly 31 has four tines 32 connected to and radiating outward from the cutting shaft 12. A greater, even number of tines 32 could be used, preferably six (6) or eight (8).

Referring again to FIG. 3, a curved blade 33 is attached to an end of each tine 32 as an extension to its length. Each blade 33 is curved away from the plane of the tine assembly 31 in a direction generally along and at a gradually decreasing angle to the cutting shaft 12. Each blade 33 of the four in each tine assembly 32 is curved in a direction opposite that of two adjacent blades 33, so that the blades 33 alternate in orientation of curvature, two being curved downward in the direction of the tilling action (toward the ground) when in operation, and the other two being alternately curved upward in the direction opposite the tilling action (away from the ground) when the apparatus 10 is in operation. FIG. 3 shows two of the three cutting shaft assemblies 30 and for each tine assembly 31 shows two of the four tines 32, those being the opposite two on each tine assembly. Thus, FIG. 3 depicts the tines 32 with an upward curvature; the alternating tines with a downward curvature are not shown. As the tines 32 cut into the ground, the rotation of all three cutting shaft assemblies 30 provides the mixing action.

An alternate embodiment includes a single tine-blade made with the same characteristics as a tine 32 with a curved blade 33 at its end (i.e., one long blade instead of two short segments). Another alternate embodiment includes tine assemblies having central tine-blades, each tine-blade comprising two oppositely curved blades at its ends.

Also referring to FIGS. 3 and 6, a preferred embodiment of the apparatus 10 comprises an injection line 34. The injection line 34 runs in a generally vertical direction parallel to the drive shaft 11 and cutting shafts 12, preferably behind the ripper 18 to avoid damage to the injection line, and in front of the tine assemblies so the reagent is evenly mixed into the soil. The injection line 34 may be easily attached at the top of the apparatus 10 to a source line of the treatment reagent, powder or liquid, which is to be injected into and interspersed with the soil. The injection line 34 carries the treatment agent along its length under pressure and disperses it, preferably by way of a number of perforations 35 in the injection line 34, into the soil surrounding the apparatus 10 in operation.

As the reagent is being injected into the soil, the blades of the apparatus are mixing the reagent into the soil. This surprisingly allows for vertical and horizontal mixing and even distribution of the reagent in the soil. Where the soil is contaminated with one or more heavy metals, for example, the specially selected reagent (or reagents) selectively binds with the heavy metal(s) in situ. The resulting compound formed by the reagent and the heavy metal contaminant is harmless enough to be left in the soil, avoiding the necessity of carting the soil off to landfills.

Continuing with FIG. 3, the perforations 35 are preferably small and evenly spaced along the last third of the injection line 34. They distribute the reagent directly to the different blades behind the injection line, which allows more even mixing of the reagent into the soil. Although the reagent is preferably distributed through the perforations 35 into the soil, it can be distributed though the injection line 34 on the surface of the ground, if desired. The injection line can be rigid or flexible. One end of the injection line 34 is preferably connected to a supply tank (not shown), which is removably connected to the excavator, and the opposite end 36 of the injection line 34 preferably ends just below the level of the bottommost tine assembly 31. A powdered reagent can be blown through the injection line at low pneumatic pressure (between about 15 and 20 psi), or it can be mixed with water or other suitable solvent and distributed via the injection line.

Alternatively, other flowable materials, such as fertilizer, cement, etc. can be injected into the soil through the injection line 34. The apparatus of the present invention can be used in other applications where the breaking up and mixing of soils is called for, such as tilling and fertilizing soil, or building roadbeds. This apparatus can also be used for fixation or solidification of soils.

One material after another can be injected through the injection line 34, or several compatible materials can be pre-mixed and distributed through the injection line. Several injection lines 34 can be attached to the apparatus 10, if preferred. An injection line 34 can be detached and another injection line with different perforations or of a different material can be attached in its place. An injection line can be placed down the center of a cutting shaft 12, if desired. The diameter and number of the perforations 35, and/or the diameter of the injection line 34 can be chosen to reflect the viscosity and desired flow rate of the reagent, where a particular reagent is used frequently in the apparatus. The present apparatus is especially advantageous where very low levels of a reagent are appropriate. For example, 2% by weight of a powdered reagent is generally difficult to distribute evenly into a ton of soil, but not with the present apparatus. Also, the injection line can be used to spray water if the ground is dusty and visibility is becoming a problem for the operator. On occasion, levels of a contaminant are low enough that a thorough mixing of the soils into a homogeneous mixture can solve the contamination problem, even without the use of reagents.

Referring to FIG. 6, a preferred embodiment of the apparatus 10 includes a ripper 18 near the lower end of the drive shaft 11 and the three cutting shafts 12. The ripper 18 protects the injection line and portions of the apparatus behind it. The front portion of the ripper 18 extends outward in front of the apparatus for contacting boulders, stumps, pieces of foundation, hard pan, and the like, thus protecting the cutting shafts 12, cutting shaft assemblies 30, tine assemblies 31, etc. The ripper preferably rakes the soils to collect such debris so that it can be disposed of. The ripper 18 is optional herein. Where there is no ripper, the injection line would be exposed. Therefore, where there is no ripper, it is preferred that the reagents be injected through a hollow in the center of the drive shaft 11. In that case, the lower portion of the drive shaft is perforated and acts as a sparger to spray the chemicals.

Typically, in operation, the operator pushes the arm of the excavator out about 12 feet, then places the apparatus down on the ground as the shafts spin. The apparatus immediately begins breaking up and digging down into the soil. The blades mix the soil as the reagent is injected into the soil via the injection line, or sparge. The excavator pulls the apparatus in until it has ground close to the excavator. Then the operator extends the excavator arm again to the start of a new row adjacent to the first, tilled 10–12 foot row. The operator pulls the arm in again as the soil is mixed, and the process is repeated. The apparatus can extend into the soil up to the length of the cutting shafts, which is most preferably about four feet. The apparatus somewhat resembles a giant electric cake mixer when it is in operation. When it is not in use, the apparatus 10 can be detached from the excavator and stored, and the excavator can be used for other jobs. Also, the apparatus can then be reattached to another piece of equipment, such as a backhoe.

Thus, the present rotating tiller apparatus 10, which is particularly useful in environmental remediation, includes: a motor-driven drive shaft 11, and three cutting shafts 12, each having six or more vertically arranged tine assemblies 31. Each tine assembly 31 in turn has four tines 32, each ending in a curved blade 33 of alternating vertical orientation. When the apparatus 10 is operating, the drive shaft 11 rotates, turning the cutting shafts 12 and tine assemblies 31, and simultaneously causing the tine assemblies 31 to spin opposite the rotation of the drive shaft, thereby breaking up and mixing the soil both horizontally and vertically.

When in operation, the apparatus of the present invention is attached to an excavator, backhoe, crane, or other suitable piece of equipment. The motor causes the rapid rotation of the several shafts 11, 12, as described above, allowing the cutting and mixing portion of the apparatus to penetrate the ground rapidly and break up and mix the soils as it penetrates. The use of three (or more) cutting shafts 12 and a number of vertically arranged tine assemblies 31 allow the apparatus to operate simultaneously across a wide plane of action and to a great depth (e.g. up to about four to six feet). At the same time, the injection line 34 allows treatment reagents to be injected into the ground when desired while the apparatus 10 is operating, and mixed across the same planes and depths within the soil, both vertically and horizontally.

In an alternate embodiment for unusually deep soil contamination or mixing requirements, the apparatus 10 further includes a second set of cutting shafts, tine assemblies, etc. Each cutting shaft 12 would be connected end to end with a corresponding cutting shaft 12 from the first set of cutting shafts. In that case, the lower ends of the first set of cutting shafts would have a means of attachment, such as threading, for attachment to the threaded upper ends of the second set of cutting shafts. Thus, three cutting shaft assemblies can be attached end to end with the existing three cutting shaft assemblies to achieve mixing at even greater soil depths in this alternate embodiment.

A method according to the present invention for mixing a liquid or powdered ingredient into soils, includes the steps of: (a) tilling and mixing the soils vertically and horizontally with a vertical rotating tiller; and (b) generally simultaneously and relatively evenly injecting the ingredient into the soils by pushing it through at least one vertically oriented injection line on the vertical rotating tiller. This is especially useful where the soils are contaminated with a heavy metal, and the ingredient is a reagent that binds with the heavy metals in the soils. Where the reagent is a powder, it is injected into the soils by blowing it through the injection line on the vertical rotating tiller.

Also included herein is a method for remediating soil contamination, the method comprising the steps of: (a) breaking up and mixing the contaminated soils across a horizontal plane and also in a vertical dimension with a vertical rotating tiller; (b) simultaneously injecting a treatment reagent or reagents into the contaminated soils surrounding the vertical rotating tiller; and (c) mixing the reagent or reagents into the contaminated soils using the vertical rotating tiller. Step (b) preferably includes channeling the reagent through a hollow in the center of the drive shaft, and spraying the reagent into the ground out of perforations in the lower portion of the drive shaft.

From the foregoing it can be realized that the described apparatus of the present invention may be easily and conveniently utilized for effectively tilling and breaking up and/or mixing heterogeneous contaminated soils in place, and for effectively blending treatment reagents with the soils. This apparatus can be attached to and removed from a backhoe or other suitable piece of equipment as a unit, and thus is highly mobile, allowing for a minimum of staging and setup time. The hydraulics are easy to attach also, significantly reducing mobilization time and costs. The vertical orientation of the apparatus allows for easy movement in confined spaces. Thus the apparatus provides enhanced capabilities for treatment and stabilization for contaminated soils.

While preferred embodiments of the invention have been described using specific terms, this description is for illustrative purposes only. It is to be understood that any dimensions given herein are illustrative, and are not meant to be limiting. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Brief List of Reference Numbers Used in the Drawings 10 tiller apparatus
11 drive shaft
12 cutting shaft
13 housing
14 coupling
15 guide
16 lower support plate
17 lower bearing
18 ripper
19 upper support plate
20 drive assembly
21 central sprocket assembly
22 central sprocket assembly core
23 inner cam
24 nubs
25 central sprocket assembly sleeve
26 outer cam
27 sprocket
28 chain
29 drive shaft coupling
30 cutting shaft assembly
31 tine assembly
32 tine
33 blade
34 injection line
35 injection line perforation
36 end of injection line
37 drive shaft directional arrow
38 sprocket directional arrow
39 output shaft
40 upper end of drive shaft

What is claimed is:

1. A rotatable tiller apparatus for use in mixing soils in situ, the apparatus comprising:
   (a) a vertically oriented rotatable drive shaft, connected to and driven by a motor external to the apparatus;
   (b) a drive assembly connected to the drive shaft;
   (c) at least two vertically oriented, rotatable cutting shafts connected to the drive shaft through the drive assembly and at least one support plate, at least one of the cutting shafts being generally parallel to the drive shaft;
   (d) a sprocket assembly within the drive assembly connected to the drive shaft, the sprocket assembly comprising at least one rotatable sprocket for each cutting shaft;
   (e) a means of rotating the sprockets in a direction counter to the rotation of the drive shaft, the means of counter-rotating the sprockets being driven by the motor, the sprockets being rotatable in the same direction and at the same speed as one another; and
   (f) at least two generally horizontally oriented tine assemblies connected to each of the cutting shafts, the tine assemblies being arranged vertically in tandem along each of the cutting shafts, each tine assembly comprising at least one tine, the tines being rotatable with the corresponding cutting shaft, each tine being attached to each tine assembly, each tine having at least one blade at its end.

2. An apparatus according to claim 1, wherein the drive shaft is generally central to and surrounded by the cutting shafts, the cutting shafts being evenly spaced and parallel to one another and to the drive shaft.

3. An apparatus according to claim 1, wherein each blade curves in a generally vertical fashion, each blade curving in the vertical direction opposite its adjacent blades.

4. An apparatus according to claim 1, wherein the means of counter-rotating the sprockets is a chain.

5. An apparatus according to claim 1, wherein the blade and the tine are one unit.

6. An apparatus according to claim 1, further comprising an injection line connectable to a supply of chemical reagent for treating soil contamination.

7. An apparatus according to claim 1, further comprising a ripper attached to the front of the apparatus, a lower end portion of the generally vertically oriented ripper being affixed to a generally horizontally oriented lower support plate, the lower support plate being attached to a lower end portion of the drive shaft.

8. An apparatus according to claim 7, wherein each cutting shaft is divided by a sheer coupler.

9. An apparatus according to claim 1, further comprising a housing enclosing the drive assembly and the sprocket assembly.

10. An apparatus according to claim 9, comprising three of the cutting shafts, with four or five of the tines attached to each tine assembly, and wherein each of the tines is connected to and radiates outward from one of the cutting shafts.

11. An apparatus according to claim 6, wherein the apparatus is coupled to an excavator and driven by a hydraulic motor.

12. An apparatus according to claim 11, wherein a lower portion of the injection line comprises a plurality of spaced perforations, and one end of the injection line is connectable to a reagent supply tank attached to the excavator.

13. An apparatus according to claim 1, further comprising a second set of cutting shafts and tine assemblies, each cutting shaft being connected end to end with a corresponding cutting shaft from the first set of cutting shafts.

* * * * *